July 19, 1938.  D. L. BRUNER  2,124,050

RETRACTABLE LANDING LIGHT

Filed July 24, 1936

INVENTOR
DONALD L. BRUNER
BY *Robert V. Laughlin*
*Wade Trent*
ATTORNEYS

Patented July 19, 1938

2,124,050

UNITED STATES PATENT OFFICE 2,124,050

RETRACTABLE LANDING LIGHT

Donald L. Bruner, Coral Gables, Fla.

Application July 24, 1936, Serial No. 92,455

7 Claims. (Cl. 240—7.7)

This invention relates generally to retractable landing lights for aircraft and especially to improvements on the retractable landing light disclosed and claimed in my companion application, Serial Number 752,763, filed November 12, 1934; Patent No. 2,105,137, dated Jan. 11, 1938.

The primary object of the present improvement is to provide a lamp assembly which is automatic in its movement from past "dead center" or mid position to either a fully extended position or the fully retracted position with respect to a housing member and to this end the invention provides a self-acting mechanism, such as a spring toggle, combined in a novel manner with a rotatable light assembly so as to automatically move and hold the light assemby to and in either of two desired positions without permitting it to stop at any undesired or intermediate position.

The invention has the following advantages: the landing light is held by spring pressure in one of two definite positions, either fully extended or fully retracted; possible errors caused by wear of mechanism are eliminated since the toggle spring will take up such wear; the control mechanism need not be so accurately constructed since it is required to force the light only past mid position whereupon the spring will act; retaining or clamping devices are unnecessary.

A practical embodiment of the invention is represented in the accompanying drawing, wherein:—

Figure 1:
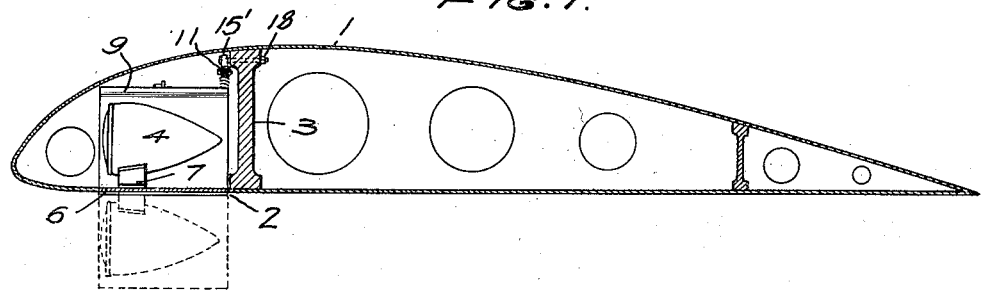
Figure 1 is a cross section of a typical airplane wing with a retractable landing light installed therein in accordance with the invention.
Figure 2:
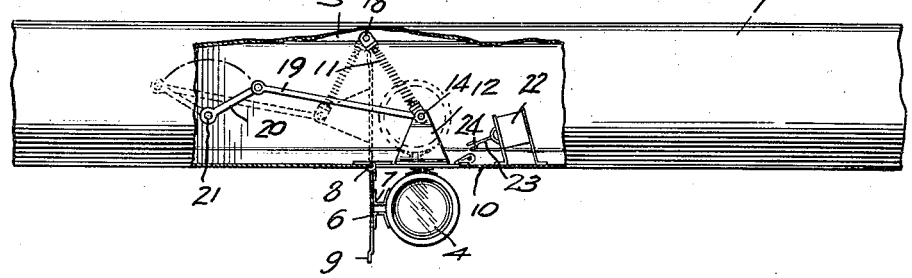
Figure 2 is a front elevation of the wing, partly broken away to more clearly disclose the landing light installation.
Figure 3:
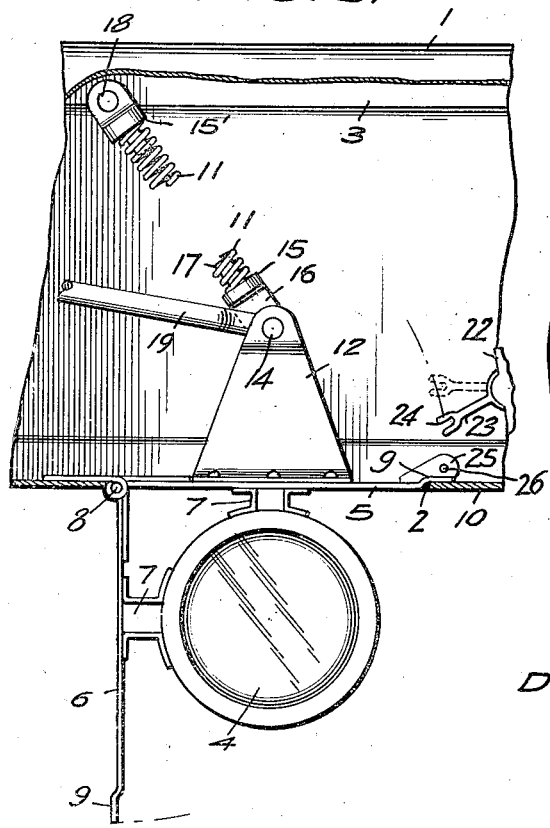
Figure 3 is an enlarged detail view of the landing light structure and installation.

As shown in the drawing, the airplane wing 1 constitutes a housing member for the lamp assembly and has an opening 2 in its bottom covering forwardly of the structural member 3. Usually, two such openings are provided; one at each end or tip of the wing in order that two landing lights may be used. The landing light proper, consisting of lamp casing, light source, reflector, cover glass, etc., is indicated generally at 4. The light 4 is positioned between and supported by two right angularly disposed plates 5 and 6, the light and the plates being rigidly interconnected by the lamp brackets 7. Plates 5 and 6 are arranged to move jointly about a common hinge or axis 8 and the entire assembly is installed in the wing so the axis 8 lies adjacent one edge of the wing opening 2 in the manner illustrated in the accompanying drawing. Hence, when the landing light is fully extended as shown in Figures 2 and 3, plate 5 completely and smoothly covers the wing opening and when the landing light is fully retracted the wing opening is similarly covered by plate 6. Each plate is provided with an extension 9 for abutment with the wing bottom portion 10 whereby such portion acts as a stop for either direction of travel of the landing light.

Figure 4:
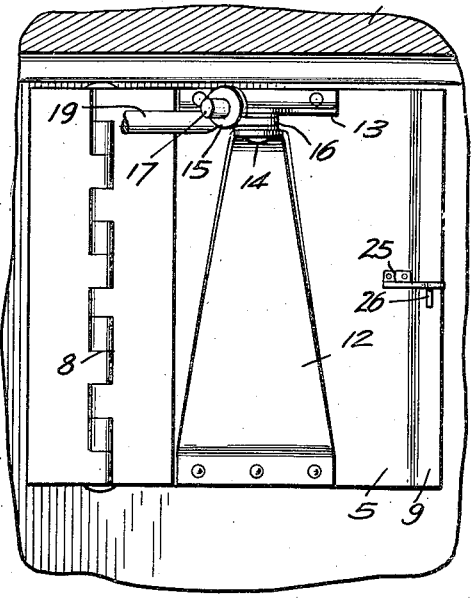
Figure 4 is a top plan view of the landing light assembly.

To hold the landing light in either of two desired positions, such as fully extended or fully retracted, and also to cause the light to pass from one desired position to the other without stopping at any undesired or intermediate position, a spring toggle mechanism is provided. This mechanism may use either tension or compression springs. In the device shown in the accompanying, a compression spring 11 forms one arm of the toggle mechanism and brackets 12 and 13, fastened to the top side of plate 5, form the other toggle arm. Brackets 12 and 13 project a short distance upwardly of the top surface of the plate 5 and jointly support a pivot member 14 between their respective upper ends, as shown in Figures 3 and 4. Mounted to turn on the pivot member is a spring-seating element comprising a disk 15 having a right angularly disposed offset flange 16 on one face thereof and a centrally projecting lug or spindle 17 on the opposite face. The flange 16 has a bearing on the pivot member 14 and provides a supporting journal for the disk 15. A similarly constructed spring seating element 15' is centered at an appropriate distance vertically above the hinge or axis 8 of the hingedly mounted landing light assembly and is mounted to turn about a pivot 18; the latter being supported by the structural member 3 of the wing. The compression spring 11 is confined between the two spring seating elements 15 and 15' with its terminal ends inserted over the spindles of the respective disks whereby it is held against displacement from between the seating disks. Brackets 12 and 13 are so designed, as shown in Figures 3 and 4, as to locate the pivot member 14 substantially in the vertical plane of the pivot member 18.

When the landing light is in its fully retracted position, as indicated by the dotted lines of Figure 2, the pivot 14 is disposed to the left of the hinge axis 8 and the downward thrust of the compression spring 11 holds the landing light in its retracted position. When the landing light is in its fully extended position as shown in full lines, the pivot member 14 is located to the right of the hinge axis and the thrust of the spring holds the light in its fully extended position. At a mid position of the landing light, the pivot member 14 is vertically above the hinge axis 8, or at dead center, with the spring 11 at maximum compression but exerting no thrust either to the right or left of the hinge axis. Any slight movement of the landing light past mid position releases the full thrust of the compressed spring 11 to effect the sudden sharp motion of the landing light into either fully extended or fully retracted position, depending upon whether the displacement from mid position is to the right or left of the hinge axis 8. Hence, the movement of the landing light from mid position to either fully retracted or fully extended position is automatic and without any manual effort on the part of the pilot.

The movement of the landing light from either its fully retracted or fully extended position to the mid position may be accomplished by any suitable mechanism under control of the pilot. For example, the light may be extended and retracted by any of several types of conventional motion transmitting devices such as pull through cables, push through rods, a combination of push rods and pull cables, electrical solenoid action, and the like. It will be noted in this connection that the pilot control mechanism need not be so accurately constructed as is usually necessary for landing light installations since, for the purpose of the present invention, it is required to force the light only past the mid position whereupon the toggle spring 11 acts to complete the movement of the light to the desired position. A convenient form of pilot control mechanism is shown in the drawing and comprises a connecting rod 19 having one end pivotally supported on the pivot member 18 of the toggle joint and its other end pivotally connected to the crank 20 of a crank shaft 21; the latter being suitably supported, for turning, within the wing structure in any suitable manner. Any means may be employed for turning the crank shaft from the pilot's cockpit.

To provide for the automatic lighting and extinguishing of the landing light lamp, a switch 22, having a lever 23 terminating in a forked outer end 24, is suitably mounted on the inner side of the wing bottom covering with the forked end of the lever disposed in the path of movement traveled by a switch operating element 25 carried by plate 5. The switch 22 is adapted to be connected in the lamp circuit and in the retracted position of the light, the switch lever occupies the position indicated in dotted lines in Figure 3. When extending the landing light the striker pin 26 of the switch operating element moves into abutment with the lower prong of the forked lever shortly prior to light reaching its fully extended position whereupon the pin, in its further movement with the plate 5, moves the switch lever downwardly, thus closing the circuit to the lamp. In like manner, the abutment of the pin 26 with the top prong of the fork, when retracting the light, opens the switch and extinguishes the lamp.

Changes and modifications in the construction and arrangements of parts of the invention may be made within the limits and scope of the appended claims.

Having thus described the invention, I claim

1. An extendible and retractable landing light for aircraft comprising a lamp assembly carried by the aircraft and including a lamp between and supported by two right angularly disposed plates jointly movable about a common axis, pilot-controlled means for turning said assembly about its axis to a past mid position between its fully extended and fully retracted positions, a stop located between the plates on a line bisecting the angle through which the plates move for abutment with one of the plates in the fully extended position of the assembly and with the other plate in the fully retracted position of the assembly, and self-acting means for moving the assembly from past mid position to either the fully extended or fully retracted position.

2. An extendible and retractable landing light for airplanes comprising the combination with an airplane wing having an opening in the bottom portion thereof of a lamp assembly hingedly connected with said wing to be swung through said opening to either an extended position externally of the wing or a retracted position internally of the wing and including a pair of closure members one of which is adapted to close the wing opening in the extended position of the assembly while the other is adapted to close said opening in the retracted position of the assembly, each closure member being adapted to abut with a bottom portion of the wing whereby said portion serves as a stop in either direction of travel of the lamp assembly, and means for extending and retracting said assembly.

3. An extendible and retractable landing light for airplanes comprising the combination with an airplane wing having an opening in the bottom portion thereof, of a lamp assembly hingedly connected with said wing to be swung through said opening to either an extended position externally of the wing or a retracted position internally of the wing and including a pair of closure members one of which is adapted to close the wing opening in the extended position of the assembly while the other is adapted to close said opening in the retracted position of the assembly, each closure member being adapted to abut with a bottom portion of the wing whereby said portion serves as a stop in either direction of travel of the lamp assembly, means for extending and retracting said assembly, a lamp circuit control member on said wing bottom portion for electrical connection with the lamp assembly, and means on said closure member for operating said control member to "on" and "off" position as the lamp assembly is extended and retracted respectively.

4. An extendible and retractable landing light for an airplane comprising an airplane wing having a bottom opening therein forwardly of a spanwise structural member of the wing, a lamp assembly carried by said wing and adapted to be turned about a horizontal axis perpendicular to the said structural member for movement through the wing opening to extended and retracted positions with respect to the wing, said lamp assembly being arranged to direct the light therefrom in a direction substantially parallel with its said axis, a spring pivotally supported at one end from the said wing structural member for movement about an axis vertically above the axis of the lamp assembly and having its other end connected with said assembly to exert a turning movement on said assembly in all positions of the latter except dead center, means under control of the pilot for moving said assembly from either an extended or a retracted position to a position in which the spring is effective to move the assembly to the other position, and means for preventing the assembly from movement beyond predetermined extended and retracted positions.

5. An extendible and retractable landing light for an airplane comprising a lamp assembly pivotally mounted on said wing to be moved through an opening in the wing to either an extended position externally of the wing or a retracted position within the wing and including a pair of plates one of which is adapted to close the opening in the extended position of the assembly while the other is adapted to close the opening in the retracted position of the assembly, each of said plates being adapted to abut with a bottom portion of the wing whereby said wing bottom portion acts as a stop in either direction of movement of the lamp assembly, a pivotally mounted spring toggle mechanism connected to said assembly to be moved therewith to either side of a dead center position between the fully extended and fully retracted positions of the assembly to yieldingly hold the latter by spring pressure in either position, and means for moving said assembly past dead center from either its extended or retracted position.

6. The combination with a vehicle of a light-projector mounted on the vehicle to be turned about an axis through a selected angle to and from extended and retracted positions with respect to the vehicle and having its hinge axis and its directed beam substantially in parallelism with the direction of travel of the vehicle, manually operated means for turning the light-projector to a predetermined position between fully extended and fully retracted positions, and self-acting means operating in the predetermined position of the light-projector automatically to accelerate the turning of the light projector in the direction in which initially moved by the said manually operated means.

7. The combination with an airplane wing of a light-projector hingedly connected with the wing to be turned through a selected angle to and from extended and retracted positions with respect to the wing and having its hinge-axis and its projected beam substantially in parallelism with and in the direction of the chord of the wing, pilot-controlled means for turning the light-projector to a predetermined position between its fully extended and the fully retracted positions, and self-acting spring means operating in the said predetermined position of the light-projector automatically to accelerate the turning movement of the light-projector in the direction in which initially moved by the pilot-controlled means.

DONALD L. BRUNER.